United States Patent
Hebert et al.

(10) Patent No.: US 11,979,395 B2
(45) Date of Patent: May 7, 2024

(54) APPLICATION SECURITY THROUGH DECEPTIVE AUTHENTICATION

(71) Applicant: SAP SE, Walldorf (DE)

(72) Inventors: Cedric Hebert, Mouans Sartoux (FR); Anderson Santana de Oliveira, Antibes (FR); Merve Sahin, Antibes (FR)

(73) Assignee: SAP SE, Walldorf (DE)

( * ) Notice: Subject to any disclaimer, the term of this patent is extended or adjusted under 35 U.S.C. 154(b) by 444 days.

(21) Appl. No.: 17/034,487

(22) Filed: Sep. 28, 2020

(65) Prior Publication Data

US 2022/0103545 A1 Mar. 31, 2022

(51) Int. Cl.
*H04L 29/06* (2006.01)
*H04L 9/40* (2022.01)

(52) U.S. Cl.
CPC ...... *H04L 63/0853* (2013.01); *H04L 63/0281* (2013.01); *H04L 63/083* (2013.01); *H04L 63/1416* (2013.01)

(58) Field of Classification Search
CPC ............. H04L 63/0853; H04L 63/0281; H04L 63/083; H04L 63/1416; H04L 63/1491
See application file for complete search history.

(56) References Cited

U.S. PATENT DOCUMENTS

| 8,468,598 | B2 | 6/2013 | Hebert | |
| 10,986,129 | B1* | 4/2021 | Sellers | H04L 63/1491 |
| 2008/0256172 | A1 | 10/2008 | Hebert et al. | |
| 2009/0077376 | A1 | 3/2009 | Montagut et al. | |
| 2009/0222399 | A1 | 9/2009 | Gomez et al. | |
| 2009/0327317 | A1 | 12/2009 | Ulmer et al. | |
| 2011/0276597 | A1* | 11/2011 | Little | H04L 63/1416 709/227 |
| 2012/0042364 | A1* | 2/2012 | Hebert | G06F 21/554 726/6 |
| 2012/0144034 | A1* | 6/2012 | McCarty | H04L 63/0823 709/225 |

(Continued)

OTHER PUBLICATIONS

Frederico Araujo et al., From Patches to Honey-Patches: Lightweight Attacker Misdirection, Deception, and Disinformation, Nov. 3, 2014, ACM, pp. 942-953. (Year: 2014).*

(Continued)

*Primary Examiner* — Luu T Pham
*Assistant Examiner* — Fahimeh Mohammadi
(74) *Attorney, Agent, or Firm* — Klarquist Sparkman, LLP

(57) ABSTRACT

Systems, methods, and computer media for securing software applications are provided herein. Through an enhanced authentication token, an application session request can be deceptively authenticated. When a malicious session request is detected, an enhanced authentication token can be generated that appears to successfully authenticate the session but contains information indicating that the session is malicious. The attacker believes that the session has been authenticated, but the information in the token indicating that the session is malicious causes an application clone session to be established instead of an actual application session. The clone session appears to be an actual application session but protects the valid user's account by including fake data instead of the user's actual data.

12 Claims, 7 Drawing Sheets

(56) References Cited

U.S. PATENT DOCUMENTS

| | | | |
|---|---|---|---|
| 2013/0160079 A1* | 6/2013 | Hebert | H04L 63/145 |
| | | | 726/3 |
| 2013/0262397 A1 | 10/2013 | Hebert | |
| 2014/0372517 A1* | 12/2014 | Zuili | H04L 65/60 |
| | | | 709/203 |
| 2014/0372927 A1 | 12/2014 | Hebert et al. | |
| 2015/0013006 A1* | 1/2015 | Shulman | H04L 63/1416 |
| | | | 726/23 |
| 2015/0033346 A1 | 1/2015 | Hebert et al. | |
| 2015/0312038 A1* | 10/2015 | Palanisamy | G06Q 20/385 |
| | | | 713/155 |
| 2016/0078234 A1 | 3/2016 | Li et al. | |
| 2016/0099953 A1 | 4/2016 | Hebert et al. | |
| 2016/0112376 A1 | 4/2016 | Gomez et al. | |
| 2016/0337321 A1* | 11/2016 | Lin | H04L 9/3263 |
| 2017/0019421 A1 | 1/2017 | Hebert et al. | |
| 2017/0169217 A1 | 6/2017 | Rahaman et al. | |
| 2017/0177308 A1 | 6/2017 | Montagnon et al. | |
| 2017/0177310 A1 | 6/2017 | Mathias et al. | |
| 2018/0004978 A1 | 1/2018 | Hebert et al. | |
| 2018/0041546 A1 | 2/2018 | Gomez et al. | |
| 2018/0077174 A1* | 3/2018 | Hebert | H04L 63/1425 |
| 2019/0044925 A1* | 2/2019 | Hawkins | H04L 67/02 |
| 2019/0068641 A1* | 2/2019 | Araujo | G06F 21/566 |
| 2019/0312860 A1* | 10/2019 | Dykes | H04L 63/10 |
| 2019/0319946 A1* | 10/2019 | Fan | H04L 9/3213 |
| 2020/0213116 A1* | 7/2020 | Fattal | H04L 63/20 |
| 2021/0067551 A1* | 3/2021 | Hebert | H04L 63/1491 |
| 2021/0067552 A1 | 3/2021 | Hebert et al. | |
| 2021/0157917 A1 | 5/2021 | Hebert et al. | |
| 2021/0160277 A1 | 5/2021 | Hebert et al. | |

OTHER PUBLICATIONS

Amine Belqruch et al., SCADA security using SSH honeypot, Mar. 27, 2019, ACM, pp. 1-5. (Year: 2019).*

Italo Dacosta et al., One-Time Cookies: Preventing Session Hijacking Attacks with Stateless Authentication Tokens, Jul. 5, 2012, ACM, Volum 12, Issue 1, pp. 1-24. (Year: 2012).*

Koki Saikawa et al., Detection and Classification of Malicious Access using a Dionaea Honeypot, Dec. 5, 2019, IEEE, pp. 844-848. (Year: 2019).*

Sanchez-Rola et al., "Clock Around the Clock: Time-Based Device Fingerprinting", Oct. 2018, ACM SIGSAC Conference, 13 pgs.

"Observations From the Front Lines of Threat Hunting: A 2018 Mid-Year Review From Falcon OverWatch", https://go.crowdstrike.com/rs/281-OBQ-266/images/Report2018OverwatchReport.pdf, 20 pgs.

"The RASP market size is expected to grow from USD 294.7 million in 2017 to USD 1, 240.1 million by 2022, at a Compound Annual Growth Rate (CAGR) of 33.3%", https://www.prnewswire.com/news-releases/the-rasp-market-size-is-expected-to-grow-from-usd-2947-million-in-2017-to-usd-12401-million-by-2022-at-a-compound-annual-growth-rate-cagr-of-333-300578893.html, Jan. 8, 2018, 4 pgs.

Canarytokens by Thinkst, https://canarytokens.org/generate, accessed Aug. 13, 2019, 1 pg.

AppSensor DetectionPoints, https://www.owasp.org/index.php/AppSensor_DetectionPoints, accessed Aug. 13, 2019, 38 pgs.

\* cited by examiner

APPLICATION SECURITY THROUGH DECEPTIVE AUTHENTICATION

BACKGROUND

As reliance on the Internet and software applications has continued to grow, cyber security has also gained importance. Securing computer systems and applications against attackers employing varying malicious techniques has become a difficult task. In addition to exploiting software bugs and vulnerabilities, some attackers obtain out-of-date credentials for authorized users or attempt to log in to an authorized user's account with common passwords, variations of passwords the user has used for other accounts, or other approaches. Typical application authentication approaches either authenticate sessions when valid credentials are provided or deny sessions when invalid credentials are provided and are unable to detect such attacks.

DETAILED DESCRIPTION

Figure 1:
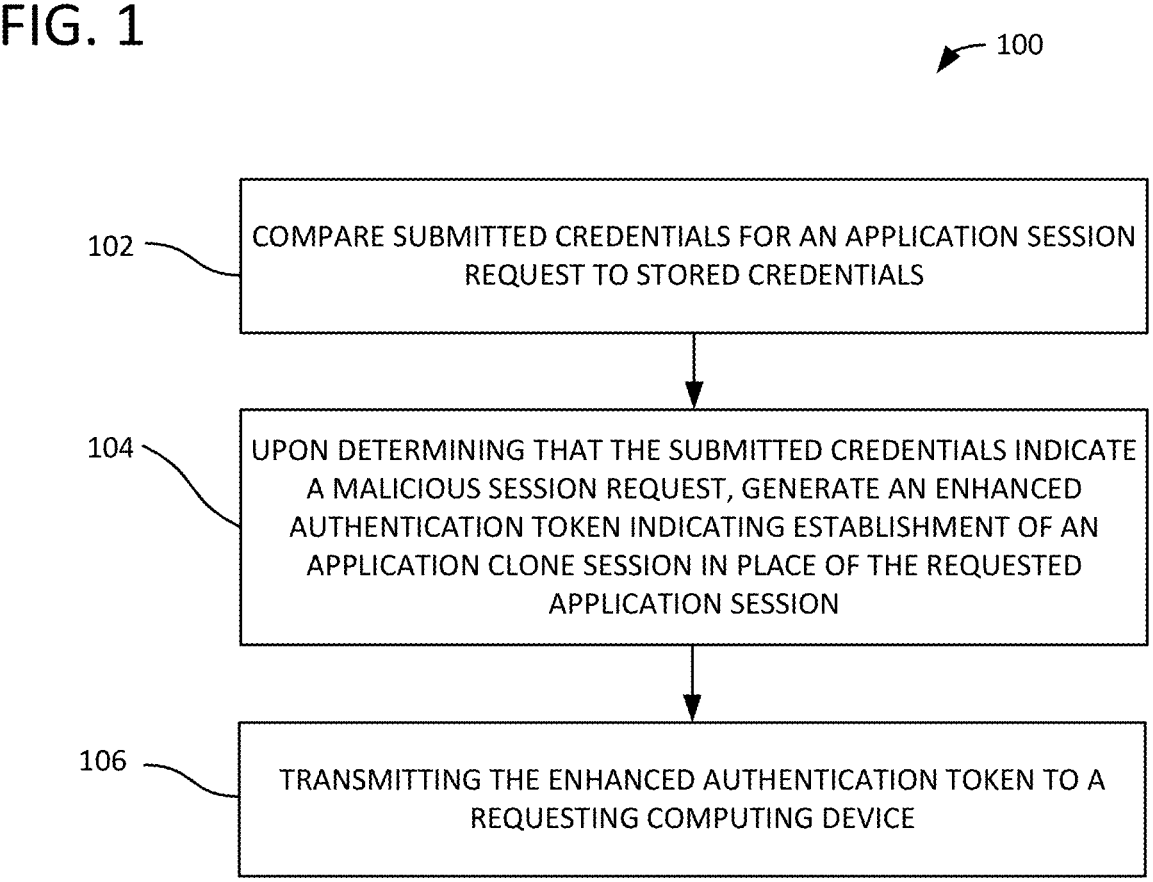
FIG. 1 illustrates an example method of securing an application in which an enhanced authentication token indicates that a session request is malicious.

The examples described herein generally secure software applications against unauthorized access using deceptive authentication. Typically, identity providers (IDPs) perform authentication services for an application (e.g., comparing submitted usernames and passwords to expected usernames and passwords) and provide a response to a session request—either an authentication token indicates successful authentication (credentials match) or denial of the session (credentials do not match).

In contrast to this binary approach, the described examples generate enhanced authentication tokens that include an indication of whether the session request is malicious. Such authentication is deceptive because to the attacker, the enhanced authentication token appears to indicate successful authentication but at the same time indicates that the session request is malicious. A session request can be determined to be malicious when, for example, a submitted password is found in a list of false passwords for the user. False passwords are passwords that an attacker might be likely to try when attempting to gain unauthorized access to a valid user's account. For example, simple or common passwords such as "password," "default," "admin," "123456," the username as the password, etc. can be false passwords. Attackers also frequently gather information about valid users whose accounts are being targeted and may try some of this information as passwords (e.g., names of loved ones, meaningful places, events, dates, etc.). These pieces of information, or variations of the information, can also be included in a list of false passwords.

A proxy between the attacker and the application can analyze the enhanced authentication token, and when a malicious session request is identified in the token, the proxy can establish a session with an application clone that includes fake data rather than establishing an actual application session. The application clone session appears to the attacker to be an actual application session, so the attacker is unaware that they have been detected. By using a clone session, the attacker's activity can be monitored, and the real user's data can be protected.

The information in the enhanced authentication token indicating that the session is malicious can be encrypted so that even if the attacker examines the authentication token, the token will appear to indicate successful authentication, and the attacker will again be unaware that they have been detected. The information can be decrypted by the proxy, and the proxy can establish a clone session if a malicious session request is indicated.

In some examples where encryption is not supported, an attack indicator (e.g., "malicious=true") can be included in the enhanced authentication token when a signature for the token is generated but removed prior to transmitting the token back to a requesting device. Because the attack indicator was removed from the token, an attacker cannot see that they have been discovered, but the signature still reflects that the session has been flagged as malicious. The proxy determines that the signature is invalid for establishing an application session because the attack indicator is missing, thus not matching the signature. The proxy can then add the attack indicator (which is standard between the IDP and proxy) back into the token to see if the signature becomes valid. If the signature is valid with the attack indicator added back in, this indicates establishment of an application clone session.

As a specific example, an attacker attempts to log in to a valid user's account for a web application using a password that is a guess based on the name of the valid user's child. The attacker's browser sends a request for an application session, which is received at a proxy in front of the application. The proxy instructs the browser to authenticate through an IDP. The browser then provides the valid user's username and the attacker's guessed password to the IDP for authentication.

The IDP compares the submitted password to a stored password for the user. Upon finding that the submitted password does not match, rather than simply issuing a denial, the IDP compares the submitted password to a group of stored false passwords for the user. Upon finding a match, the IDP generates an enhanced authentication token that includes information indicating that the session request is malicious (also referred to herein as an "attack indicator"). This can be, for example, a field or flag such as "malicious: true." The IDP then encrypts the enhanced authentication token (or at least the "malicious: true" portion) and sends the token back to the browser. The browser then forwards the enhanced authentication token to the proxy, where the token is decrypted.

Because the token is encrypted, even if the attacker were to examine what had been returned to the browser by the IDP, the attacker would be unable to tell that they had been discovered. To the attacker, the enhanced authentication token simply appears to be a successful authentication. The proxy, however, acts as a gatekeeper invisible to the attacker and can decrypt the token and determine that the session request has been flagged as malicious. Rather than establishing an application session, the proxy instead establishes an application clone session including fake data. In this way, the actions of the attacker can be monitored while not exposing the valid user's data. Monitoring the attacker's behavior can help identify security vulnerabilities or provide other information about the attacker's motives that can be used to better secure the application. Examples are described below with reference to FIGS. 1-7.

FIG. 1 illustrates a method 100 for securing an application. The application can be a web application, a locally executing application, or a network application. In process block 102, submitted credentials for an application session request are compared to stored credentials. Credentials can be entered by a user and can be a username, symbol, digital fingerprint, or other identifier paired with a password, pass phrase, personal identification number, or other code. The comparing of submitted credentials to stored credentials can be done by an identity provider (IDP). An IDP is a web service or application that authenticates users for another application. The IDP stores credentials for user accounts and compares submitted credentials to what is stored.

In process block 104, upon determining that the submitted credentials indicate a malicious session request, an enhanced authentication token is generated. The enhanced authentication token can be generated, for example, by an IDP. The enhanced authentication token indicates establishment of an application clone session in place of the requested application session. The clone session includes at least some alternative data in place of data associated with an application account for the valid user/username. The clone session allows an attacker to think they have successfully gained access (so the attacker can be monitored) by providing the same look and feel as the application, but because some or all of the data in the clone session is fake data not actually associated with the valid user, the user's real data remains secure. Clone sessions are discussed in more detail with respect to FIG. 2.

A session request can be determined to be malicious, for example, when the submitted credentials include a valid username and a password that does not match the stored, expected password for the username but instead matches a false password in a stored group of false passwords associated with the username. False passwords are passwords that an attacker might be likely to try when attempting to gain unauthorized access to a valid user's account. Simple or common passwords such as "password," "default," "admin," "123456," the username repeated as the password, etc. can be false passwords. Old passwords for the username, including previously compromised passwords, can also be false passwords.

Other examples of false passwords include a password associated with the valid username for other accounts of the valid user (e.g., for other applications/services), a modified version of a previously used password for the username (e.g., the user might increment a numeral at the end of the password each time a password reset is required), or passwords based on user identification information. False passwords based on user identification information can be or can include names of loved ones or friends (partner, child, grandparent, best friend, etc.), meaningful places, events, dates (including birthdates, anniversary dates, birth dates of children, etc.), favorite movies, bands, restaurants, or other information related to the user. False passwords can be generated automatically or manually based on user responses to a questionnaire, mining available data about the user from internet usage or records, mining social media pages or posts, mining user emails, by adding compromised passwords identified, e.g., on the dark web, by adding the user's old password when the password is changed, or by generating variations of passwords used for other accounts. For example, a user might typically use "Password" as a password base and then add an underscore and the name of the application to create different passwords for different accounts that all follow a pattern.

The malicious session request can also be indicated when a number of incorrect credentials (e.g., passwords) over a threshold have been submitted. For example, if five (or three, ten, etc.) different passwords have been submitted and are incorrect, the session request can be determined to be malicious. In examples in which false passwords are stored, when the attacker is diverted to a clone session after entering in the final password that triggered the determination of maliciousness (e.g., fifth), that final password can be added to a list of false passwords so that if the user tries the final password again for a new session, they will be diverted to the application clone as before. In some examples, stored false passwords can be limited to a certain number (e.g., 10, 20, 30, etc.), and when a new false password is added, another existing false password can be removed (e.g., a false password that has not been used in an attempted login).

The enhanced authentication token can indicate that a clone session should be established in place of a regular application session by including additional data (also referred to as an "attack indicator") that is not included in a typical authentication token. For example, a flag, field, variable, or other structure can be added to the token followed by a value, such as "malicious=true" or "clone=yes." This data can be encrypted (or the entire token can be encrypted) so that if an attacker examines the enhanced authentication token, the token will appear to be a typical successful authentication token and the attacker will be unaware that they have been detected and that a clone session is indicated.

In process block 106, the enhanced authentication token is transmitted to a requesting computing device. The requesting device can be a client computer executing a browser. Method 100 can be performed by an IDP.

In some examples where encryption is not supported, an attack indicator (e.g., "malicious=true") can be included in the enhanced authentication token when a signature for the token is generated but removed prior to transmitting the token back to the requesting device in process block 106. Because the attack indicator was removed from the token, an attacker cannot see that they have been discovered, but the signature still reflects that the session has been flagged as malicious. The signature is invalid for establishing an application session because the attack indicator is missing, thus not matching the signature. However, the attack indicator can be added back into the token (e.g., by a proxy) to see if the signature becomes valid. If the signature is valid with the attack indicator added back in, this indicates that the request was malicious and indicates establishment of an application clone session.

Figure 2:
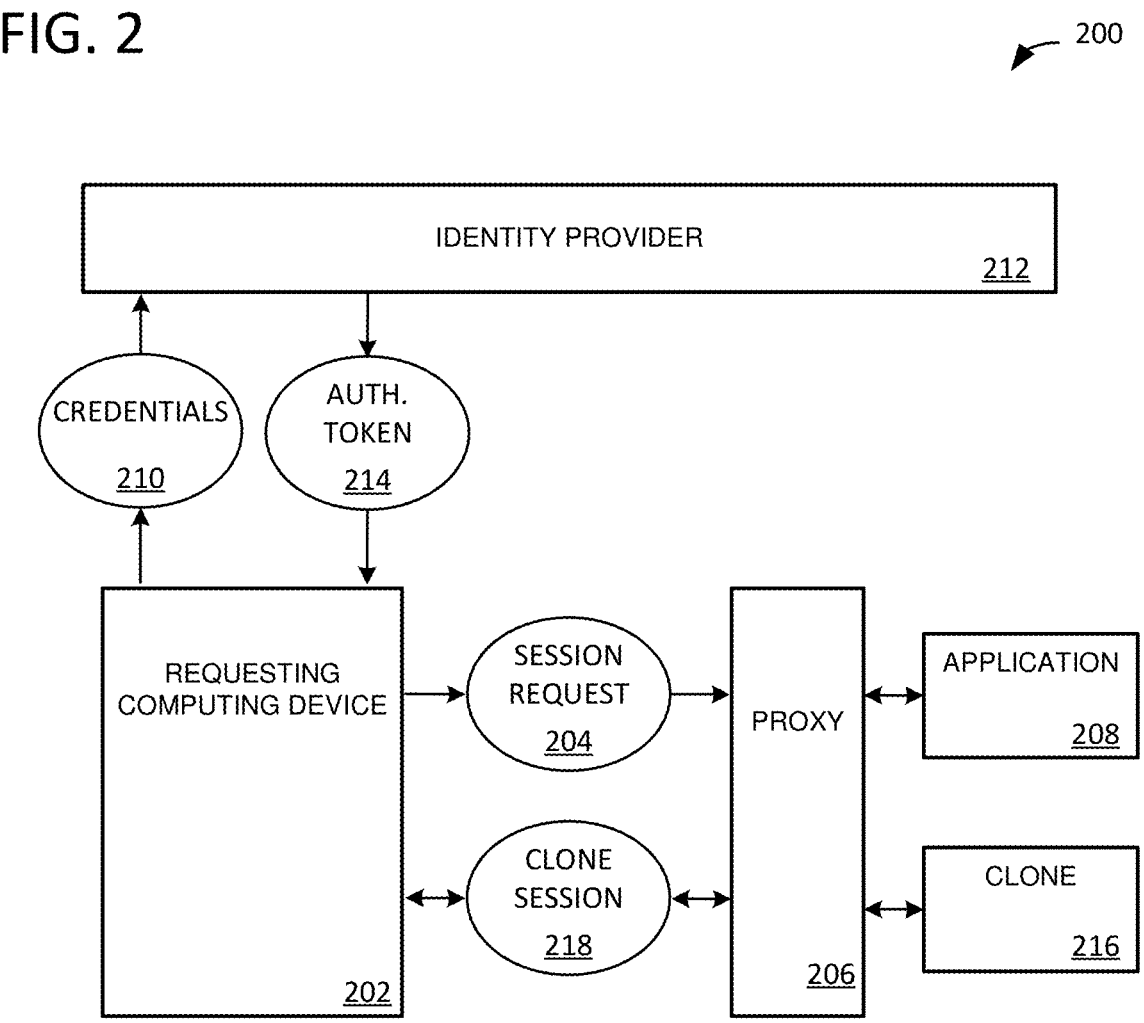
FIG. 2 is an example deceptive authentication system.

FIG. 2 illustrates an application security system 200. System 200 is capable of implementing method 100 of FIG. 1. A requesting computing device 202 generates a session request 204 and sends session request 204 to a proxy 206. As used herein, "proxy" also refers to a reverse proxy. Proxy 206 acts as an intermediary to an application 208. Proxy 206 can be implemented on or more separate server computers or on the same computer(s) as application 208. Typically, the presence of proxy 206 is not known to requesting computing device 202, and session request 204 is intended for application 208. In response to session request 204, proxy 206 instructs requesting computing device 202 to authenticate. Requesting computing device 202 provides credentials 210 to identity provider 212. Credentials 210 can include, for example, a username and a password. Identity provider 212 can be a separate application from application 208 running on the same computing device or network or can be implemented as a web service.

Identity provider 212 compares the submitted password in credentials 210 to a stored password for the username. Identity provider 212 can also compare the submitted password to a group of false passwords for the username. Examples of false passwords are discussed with respect to FIG. 1. In some examples, identity provider 212 compares the submitted password to the stored, expected password first and then compares to the false passwords. In other examples, identity provider 212 performs both comparisons simultaneously. If the submitted password matches a stored false password, this indicates a malicious session request, and identity provider 212 generates an enhanced authentication token 214 indicating establishment of an application clone session in place of the requested application session. Identity provider 212 can also identify a malicious session request when a threshold number of incorrect passwords have been received within a time limit.

Indication of a clone session can be done through a field, flag, or variable value in the token (e.g., "malicious=true"). Enhanced authentication token 214 can be encrypted such that requesting computing device 202 cannot identify that a clone session is indicated. When encryption is not supported (e.g., by the token type), indication of a clone session can be included in the signature of the enhanced authentication token (for example as discussed with respect to FIG. 1). Example enhanced authentication tokens are shown in FIGS. 4A-4C. If the submitted password is correct, identity provider 212 generates an enhanced authentication token indicating successful authentication, along with information indicating the request is not malicious (e.g., "malicious=false"). In some examples, the additional information (flag, field, variable, etc.) indicating maliciousness is only included when the request is determined to be malicious and a conventional token is generated for non-malicious requests.

Enhanced authentication token 214 is transmitted back to requesting device 202 and then sent by requesting computing device 202 to proxy 206. Proxy 206 is configured to receive and decrypt (if encrypted) enhanced authentication token 214. Proxy 206 acts as a gatekeeper between requesting devices and application 208 and application clone 216. In this way, based on received information (e.g., information in the decrypted enhanced authentication token 214), proxy 206 can either connect a requesting device with application 208 if the request is valid and authenticated or with clone 216 if the request is malicious. Upon determining that enhanced authentication token 214 indicates establishment of a clone session (because session request 204 is malicious), proxy 206 establishes a clone session 218 between requesting computing device 202 and application clone 216.

In clone session 218, the attacker sees the application interface and thinks they have successfully gained access to application 208, but some or all of the data provided in clone session 218 is generated for purposes of the clone and is not the real data the attacker is seeking. In some examples, if the attacker has already accessed some data in a previous application session (e.g., before being detected), then that data is included in clone session 218 so the attacker will not realize the session is a clone, but the remaining data is fabricated. Clone session 218 can also be called a "honeypot."

Fake data for application clone 216 can be generated automatically. Machine learning can be used to determine the characteristics of data that should be automatically generated. The fake dataset can be the same size or at least the same size as the actual dataset. Fake data can be generated by, for example, analyzing the type of data (financial figures, names, items, etc.) and/or format (integer, string, etc.) and generating similar replacement information of the same type.

In some examples, if the attacker changes the password while in clone session 218, the new password is added to a group of false passwords for the username.

Figure 3:
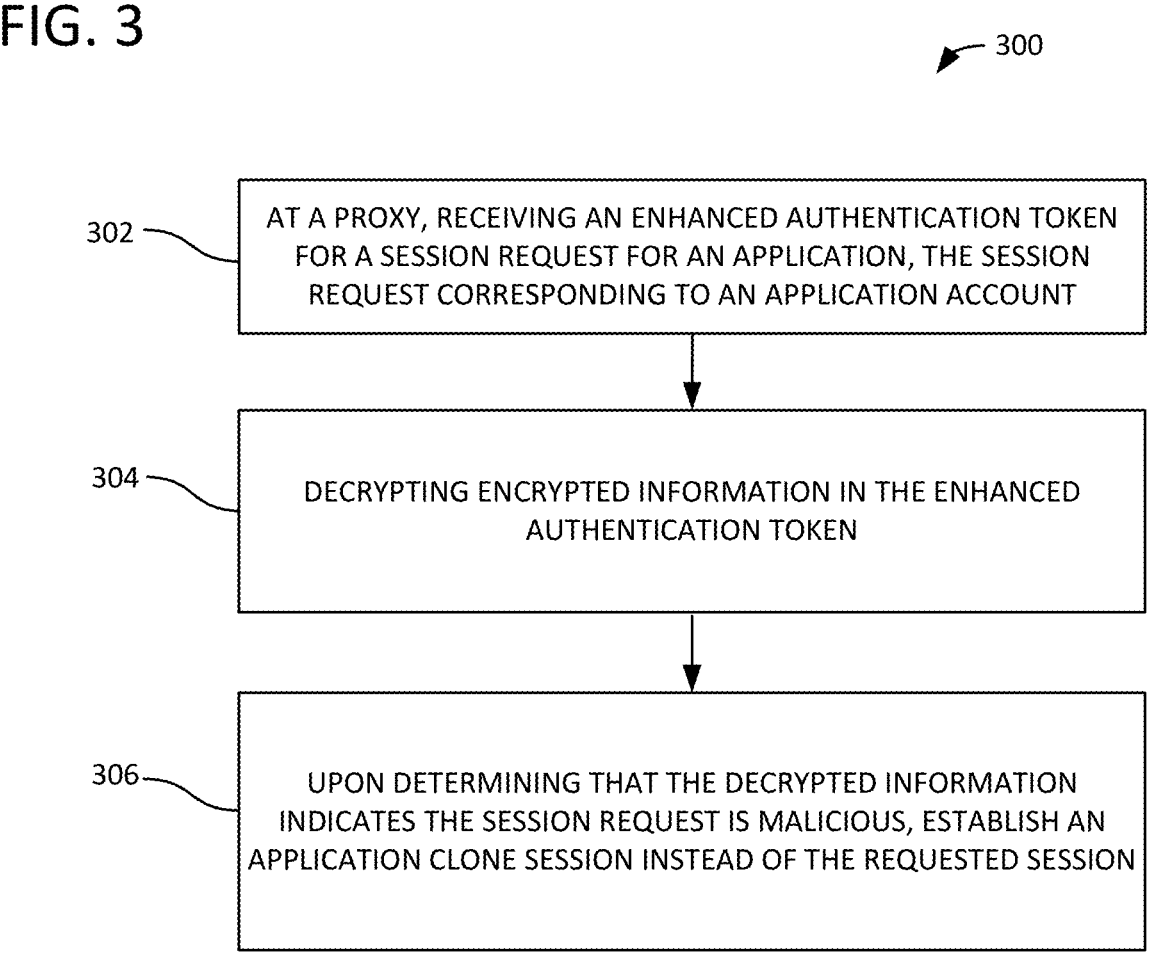
FIG. 3 illustrates an example method of securing an application in which an encrypted enhanced authentication token is decrypted, decrypted information in the token indicates that the request is malicious, and a application clone session is established in place of a requested session.

FIG. 3 illustrates a method 300 of securing an application. In process block 302, an enhanced authentication token for a session request for an application is received at a proxy. The enhanced authentication token, which can be generated by an IDP, includes information indicating whether the session request is malicious. The session request corresponds to an application account for a valid user. In process block 304, encrypted information in the enhanced authentication token is decrypted. Upon determining that the decrypted information indicates that the session request is malicious, a clone session is established in place of the requested application session in process block 306. The clone session includes at least some alternative data (fake data) in place of data associated with the application account. Method 300 can be performed by a proxy, such as proxy 206 of FIG. 2.

Figure 4:
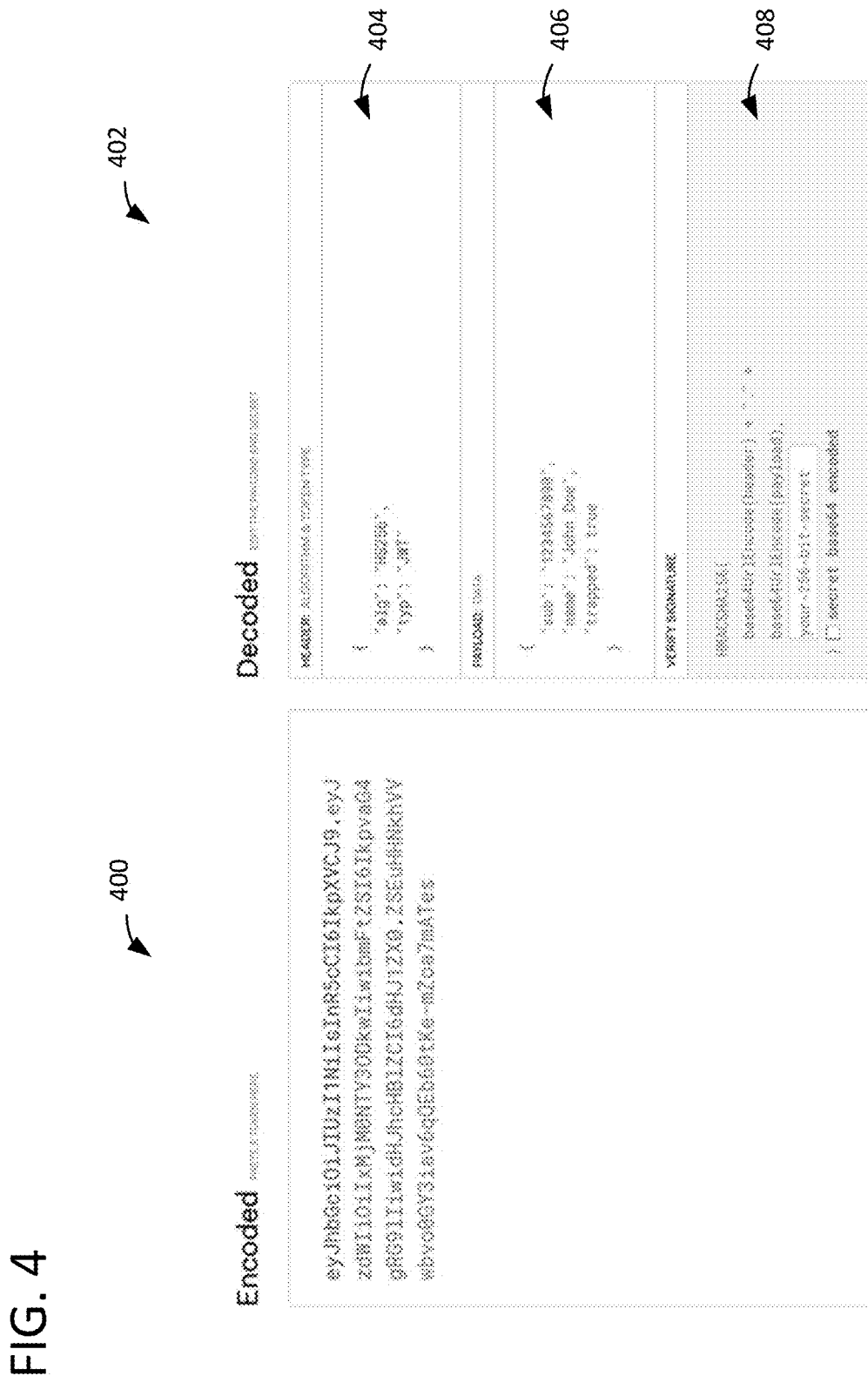
FIG. 4 illustrates an example enhanced authentication token.

FIG. 4 illustrates an example enhanced authentication token, shown as an encoded enhanced authentication token 400 and a decoded enhanced authentication token 402. Encoded token 400 shows a string of characters. Decoded token 402 illustrates three different portions of the token: header 404, payload 406, and verify signature 408. Header 404 shows that the encoding algorithm type is "HS256" and the token is "JWT," which is a JavaScript Object Notation (JSON) Web Token. Payload 406 includes the username "John Doe," as well as a "trapped" field shown as "true." "Trapped" is used to indicate whether a clone session should be established, but other identifiers or variables can also be used, such as the examples "malicious" or "clone" discussed herein (also referred to as attack indicators). Verify signature 408 includes a signature that is the hash of the header and payload and is used to verify that the token is valid.

For JWT tokens, encryption of payload 406 is not supported. To prevent an attacker from seeing the attack indicator, the signature in verify signature 408 can be generated while the attack indicator is still included in payload 406. Before encoded token 400 is transmitted to a requesting computing device, the attack indicator can be removed from payload 406, preventing the attacker from realizing they are discovered. The attack indicator is still, however, reflected in the signature in verify signature 408. To a proxy, the signature is invalid for establishing an application session. The proxy can then try adding the attack indicator back into the token to see if this makes the signature valid. If so, then a malicious session is indicated and the proxy establishes a session with the application clone rather than the actual application.

Other token types (such as Security Assertions Markup Language (SAML) tokens) can simply be encrypted to keep the attack indicator secret from an attacker. Various tokens can be modified in different ways to include information indicating that a clone session should be established.

Figure 5:
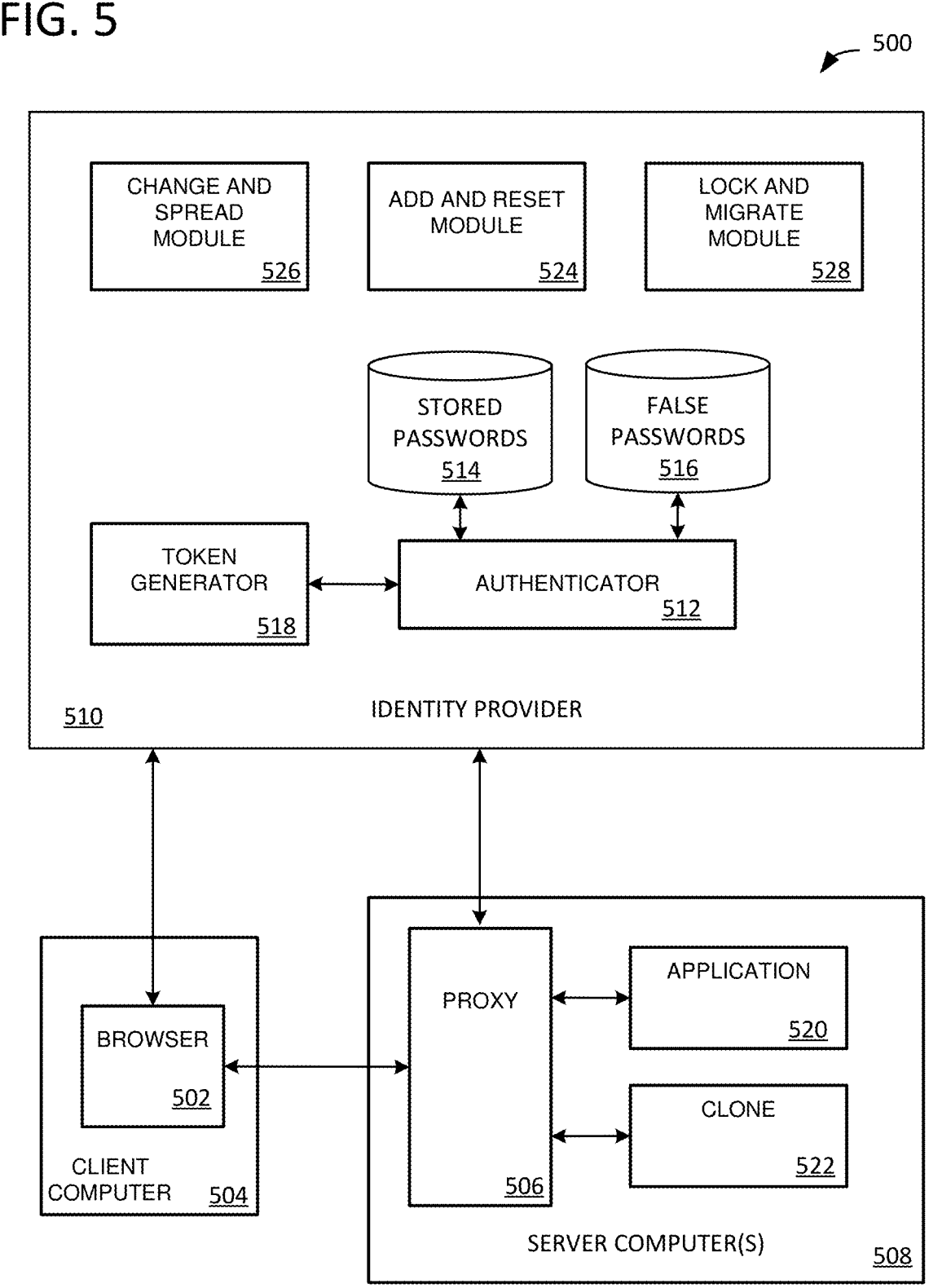
FIG. 5 is an example deceptive authentication system configured for use with web applications.

FIG. 5 illustrates an example application security system 500. An attacker interacting with browser 502 running on client computer 504 submits an application session request to proxy 506. Proxy 506 implemented on server computer(s) 508. Proxy 506 instructs browser 502 to authenticate, and browser 502 submits credentials (e.g., username and password) to IDP 510. Authenticator 512 within IDP 510 compares the submitted password for the username to stored passwords data store 514 and false passwords data store 516. In some examples, stored passwords data store 514 and false passwords data store 516 are hashes of the passwords and false passwords. If the submitted password does not match the stored password in stored passwords data store 514 but does match a false password in the false passwords data store 516, then the session request is determined to be malicious.

A token generator 518 generates (and in some examples encrypts) an enhanced authentication token indicating that the session is malicious. The enhanced authentication token is provided back to browser 502, which then forwards the token on to proxy 506. Proxy 506 can either establish a session with an application 520 or an application clone 522. Because the enhanced authentication token indicates that the session request is malicious, a session is established with application clone 522, which includes at least some fake data in place of actual data associated with the valid user.

In some examples, system 500 includes add and reset module 524, change and spread module 526, and lock and migrate module 528. Add and reset module 524 allows administrators or application providers to add new false passwords, such as passwords for other applications, compromised credentials on the dark web, etc. In some examples, add and reset module 524 is used by an administrator to add the last false password entered when a threshold has been met (e.g., five incorrect passwords entered).

Add and reset module 524 can compare new false passwords to the valid password for the username before adding the false passwords. In some cases, such as a discovered compromised password, the compromised password can be the valid password. In such cases, lock and migrate module 528 is triggered. Lock and migrate module 528 locks the user account (triggering a password reset), removes the compromised password from stored passwords data store 514, and adds the compromised password to false password data store 516.

Lock and migrate module 528 can also lock the user account if malicious activity is detected during an actual application session. For example, honeytokens can be established in application 520. Honeytokens are features, operations, data, or actions that a normal user would not attempt to access, so if access is detected, it can be inferred that the session is malicious. An example of a honeytoken being triggered is a user attempting to access an administrator page or see the source code while in an application session—such actions are unusual for a typical user.

Change and spread module 526 allows a valid user to change their password (or create a password), and after the change, stores the new password (or a hash of the new password) in stored passwords data store 514. Change and spread module 526 can also ask for personal information about the user for generation of additional false passwords.

Figure 6:
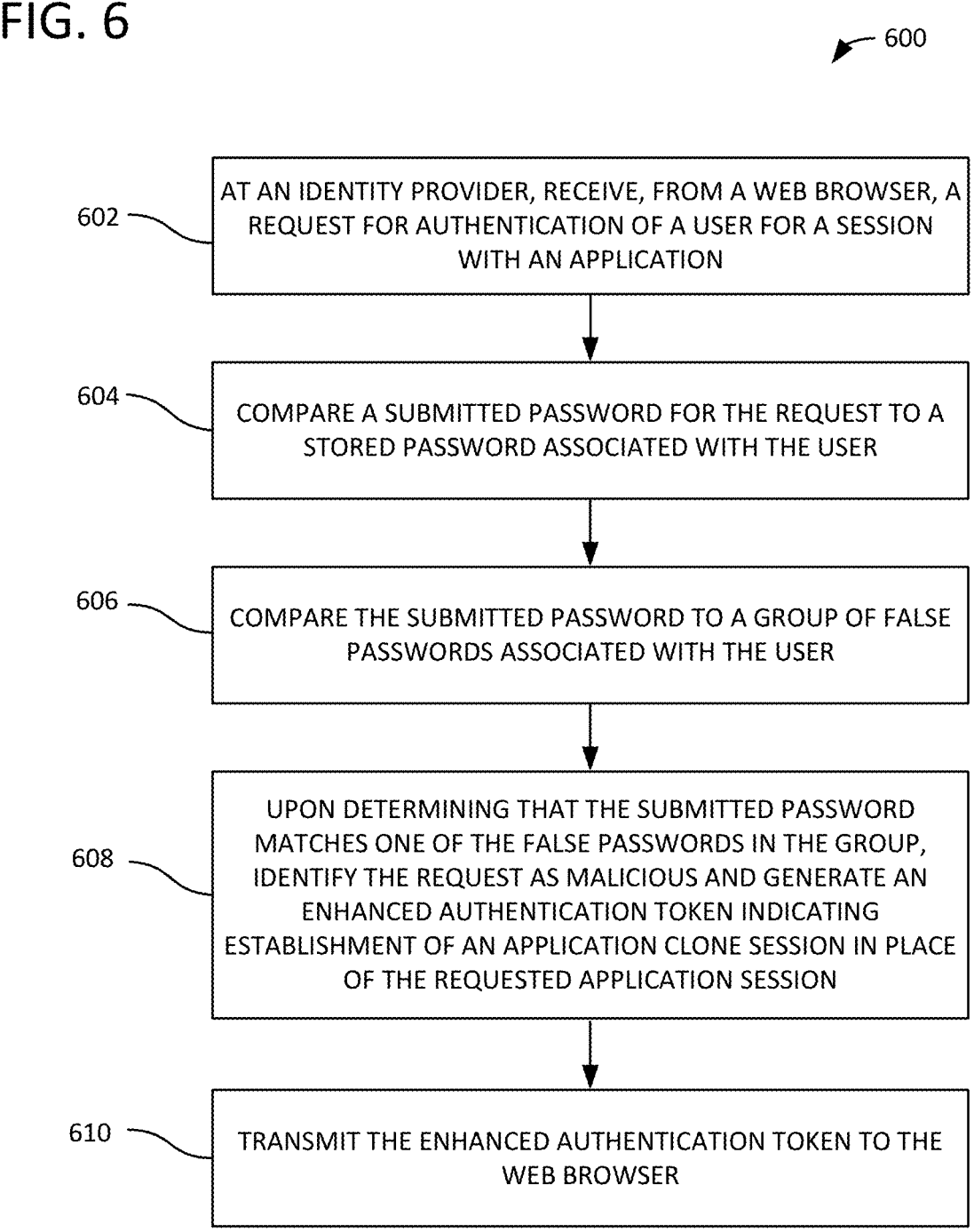
FIG. 6 illustrates an example method where the signature of the enhanced authentication token indicates establishment of an application clone session.

FIG. 6 illustrates a method 600 for securing applications. Method 600 can be performed, for example, using system 500 of FIG. 5. In process block 602, a request for authentication of a user for a session with an application is received, at an identity provider, from a web browser. In process block 604, a submitted password for the request is compared to a stored password associated with the user. In process block 606, the submitted password is compared to a group of false passwords associated with the user. Upon determining that the submitted password matches one of the false passwords in the group, the request is identified as malicious in process block 608 and an enhanced authentication token is generated. In process block 610, the enhanced authentication token is transmitted to the web browser.

A signature of the enhanced authentication token can be generated while the enhanced authentication token includes an attack indicator, and the attack indicator can be removed after the signature is generated. The signature indicates establishment of an application clone session in place of the requested application session. The clonesession includes at least some alternative data in place of data associated with the user. The enhanced authentication token can be provided to a proxy in front of the application by the web browser. The proxy determines that the signature is invalid for establishing the session with the application (because the attack indicator is missing). The proxy can then add the attack indicator back to the token to see if the signature is valid. If so, this indicates establishment of an application clone session and a malicious request. Both the IDP and proxy use the same attack indicator.

In other examples, the enhanced authentication token can be encrypted and thus appears to the web browser to be a successful authentication of an application session. The enhanced authentication token can be provided to and decrypted by the proxy. The decrypted information in the enhanced authentication token indicates establishment of the clone session.

Example Computing Systems

Figure 7:
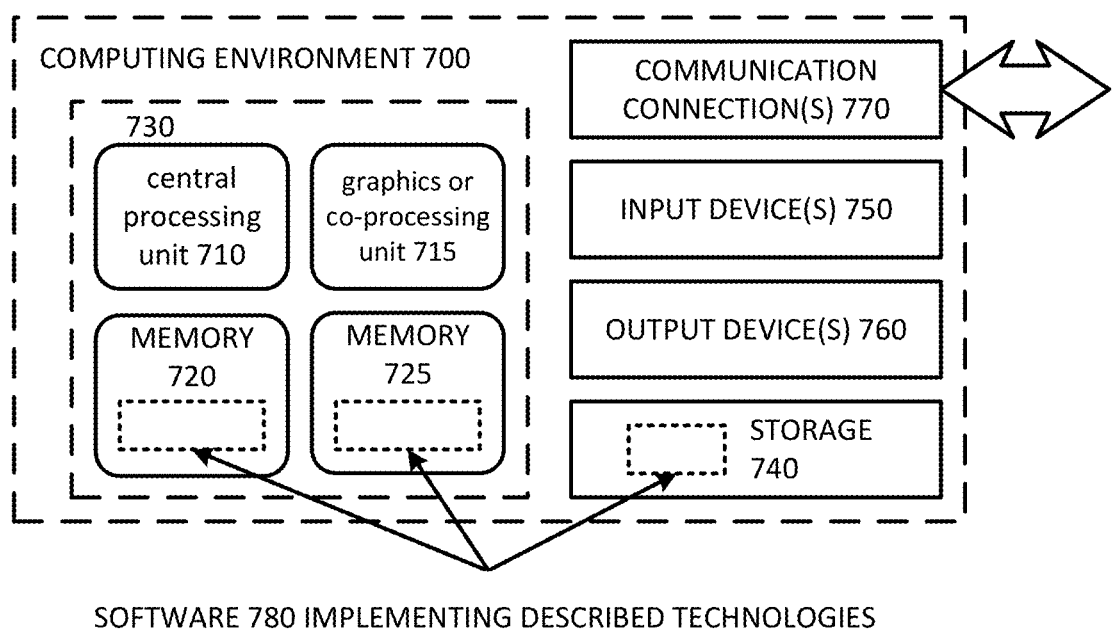
FIG. 7 is a diagram illustrating a generalized implementation environment in which some described examples can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). For example, memory 720 and 725 can store proxy 206 or IDP 212 of FIG. 2 and proxy 506 and IDP 510 of FIG. 5.

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more innovations described herein. For example, storage 740 can store proxy 206 or IDP 212 of FIG. 2 and proxy 506 and IDP 510 of FIG. 5.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A system, comprising:
a processor; and
one or more computer-readable storage media storing computer-readable instructions that, when executed by the processor, perform operations comprising:
at a proxy, receiving an enhanced authentication token for a session request for an application, the session request corresponding to an application account, the enhanced authentication token comprising encrypted information comprising a flag, field, variable, or identifier indicating that the session request has been determined to be malicious;
decrypting encrypted information in the enhanced authentication token; and
upon determining that the decrypted information comprising the flag, field, variable, or identifier from the enhanced authentication token indicates that the session request has been determined to be malicious, establishing an application clone session in place of the requested session, wherein the application clone session includes at least some alternative data in place of data associated with the application account;
wherein the enhanced authentication token is generated by an identity provider; and
the identity provider includes and encrypts information in the enhanced authentication token indicating that the session request is malicious upon determining that the session request includes a valid username and a password that matches a false password in a stored group of false passwords.

2. The system of claim 1, wherein the stored group of false passwords includes one or more of: a default password, an administrator password, a password associated with the valid username for other accounts, a compromised password, a password based on user identification information, a previously used password for the valid username, or a modified version of a previously used password for the username.

3. The system of claim 2, wherein the operations further comprise providing a new false password to the identity provider reflecting a password change performed in the application clone session.

4. The system of claim 1, wherein application session requests and corresponding authentication tokens are received through the proxy and provided by the proxy to the application.

5. A method comprising:
at a proxy, receiving an enhanced authentication token for a session request for an application, the session request corresponding to an application account, the enhanced authentication token comprising encrypted information comprising a flag, field, variable, or identifier indicating that the session request has been determined to be malicious;
decrypting encrypted information in the enhanced authentication token; and
upon determining that the decrypted information comprising the flag, field, variable, or identifier from the enhanced authentication token indicates that the session request has been determined to be malicious, establishing an application clone session in place of the requested session, wherein the application clone session includes at least some alternative data in place of data associated with the application account;
wherein the enhanced authentication token is generated by an identity provider; and
the identity provider includes and encrypts information in the enhanced authentication token indicating that the session request is malicious upon determining that the session request includes a valid username and a password that matches a false password in a stored group of false passwords.

6. The method of claim 5, wherein the stored group of false passwords includes one or more of: a default password, an administrator password, a password associated with the valid username for other accounts, a compromised password, a password based on user identification information, a previously used password for the valid username, or a modified version of a previously used password for the username.

7. The method of claim 6, further comprising:
providing a new false password to the identity provider reflecting a password change performed in the application clone session.

8. The method of claim 5, wherein application session requests and corresponding authentication tokens are received through the proxy and provided by the proxy to the application.

9. One or more non-transitory computer-readable media comprising computer-executable instructions that, when executed by a computing system, cause the computing system to perform operations comprising:
at a proxy, receiving an enhanced authentication token for a session request for an application, the session request corresponding to an application account, the enhanced authentication token comprising encrypted information comprising a flag, field, variable, or identifier indicating that the session request has been determined to be malicious;
decrypting encrypted information in the enhanced authentication token; and
upon determining that the decrypted information comprising the flag, field, variable, or identifier from the enhanced authentication token indicates that the session request has been determined to be malicious, establishing an application clone session in place of the requested session, wherein the application clone session includes at least some alternative data in place of data associated with the application account;
wherein the enhanced authentication token is generated by an identity provider; and
the identity provider includes and encrypts information in the enhanced authentication token indicating that the session request is malicious upon determining that the session request includes a valid username and a password that matches a false password in a stored group of false passwords.

10. The one or more non-transitory computer-readable media of claim 9, wherein the stored group of false passwords includes one or more of: a default password, an administrator password, a password associated with the valid username for other accounts, a compromised password, a password based on user identification information, a previously used password for the valid username, or a modified version of a previously used password for the username.

11. The one or more non-transitory computer-readable media of claim 10, wherein the operations further comprise:
provide a new false password to the identity provider reflecting a password change performed in the application clone session.

12. The one or more non-transitory computer-readable media of claim 9, wherein application session requests and corresponding authentication tokens are received through the proxy and provided by the proxy to the application.

\* \* \* \* \*